United States Patent [19]

Sunouchi et al.

[11] 4,448,507

[45] May 15, 1984

[54] CAMERA

[75] Inventors: Akio Sunouchi, Tokyo; Ryuji Suzuki, Kanagawa; Toshikazu Ichiyanagi; Masahisa Fujino, both of Tokyo, all of Japan

[73] Assignee: Minigrip, Inc., Orangeburg, N.Y.

[21] Appl. No.: 388,253

[22] Filed: Jun. 14, 1982

[30] Foreign Application Priority Data

Jun. 22, 1981 [JP] Japan .................................. 56-96412

[51] Int. Cl.³ .......................... G03B 1/12; G03B 17/38
[52] U.S. Cl. ..................................... 354/173; 354/266
[58] Field of Search ................ 354/171, 173, 266, 267

[56] References Cited

U.S. PATENT DOCUMENTS 4,118,724 10/1978 Ueda et al. ........................... 354/266
4,212,525 7/1980 Urano et al. ......................... 354/173

FOREIGN PATENT DOCUMENTS 52-56528 5/1977 Japan ................................... 354/266

Primary Examiner—John Gonzales
Attorney, Agent, or Firm—Hill, Van Santen, Steadman & Simpson

[57] ABSTRACT

A camera capable of changing over between electromagnetic release and mechanical release and to which a motor drive unit is attachable, whereby when in the mechanical release position the use of the motor drive unit permits an automatic winding operation to be initiated in response to return of the release button after the exposure has been completed.

7 Claims, 6 Drawing Figures

CAMERA

BACKGROUND OF THE INVENTION

1. Field of the Invention

This invention relates to motor drive unit-attachable cameras with means enabling both electromagnetic release and mechanical release.

2. Description of the Prior Art

It is known in the art to provide an electromagnetic release type camera adapted to be used with a motor drive unit so that a continuous succession of film winding and exposure operations can be performed as a control switch alternately changes its position when the film is advanced one frame and each exposure is completed. In such a camera, when the battery is drained of electrical energy, no additional photographs can be carried out.

As a result, it has been proposed to make the electromagnetic release type camera switchable to a mechanical release mode when a new battery is not available, thus making it possible to actuate the camera.

However, when this camera is switched to the mechanical release mode, the use of the motor drive unit as described above no longer effects automatic driving of the camera. Accordingly there arises a demand for a camera which even when switched from the electromagnetic to the mechanical release mode retains its cooperation with the motor drive unit to effect automatic driving.

SUMMARY OF THE INVENTION

It is an object of the present invention to eliminate the above-described drawbacks and to provide a camera with a control switch for a motor drive unit being arranged upon changing over from the electromagnetic release to the mechanical release mode to be responsive to the release button so that when the winding operation and the exposure operation are terminated, the control switch alternately changes its positions, permitting the motor drive unit to drive the camera for the winding operation.

Another object of the present invention is to minimize the magnitude of force necessary to release the film transportation mechanism from locking connection at the time of completion of the exposure, inasmuch as the film transportation mechanism is locked when the last cycle of film winding operation was completed.

These and other objects of the invention will become apparent from the following detailed description of a practical embodiment thereof.

DESCRIPTION OF THE PREFERRED EMBODIMENT

Figure 1:
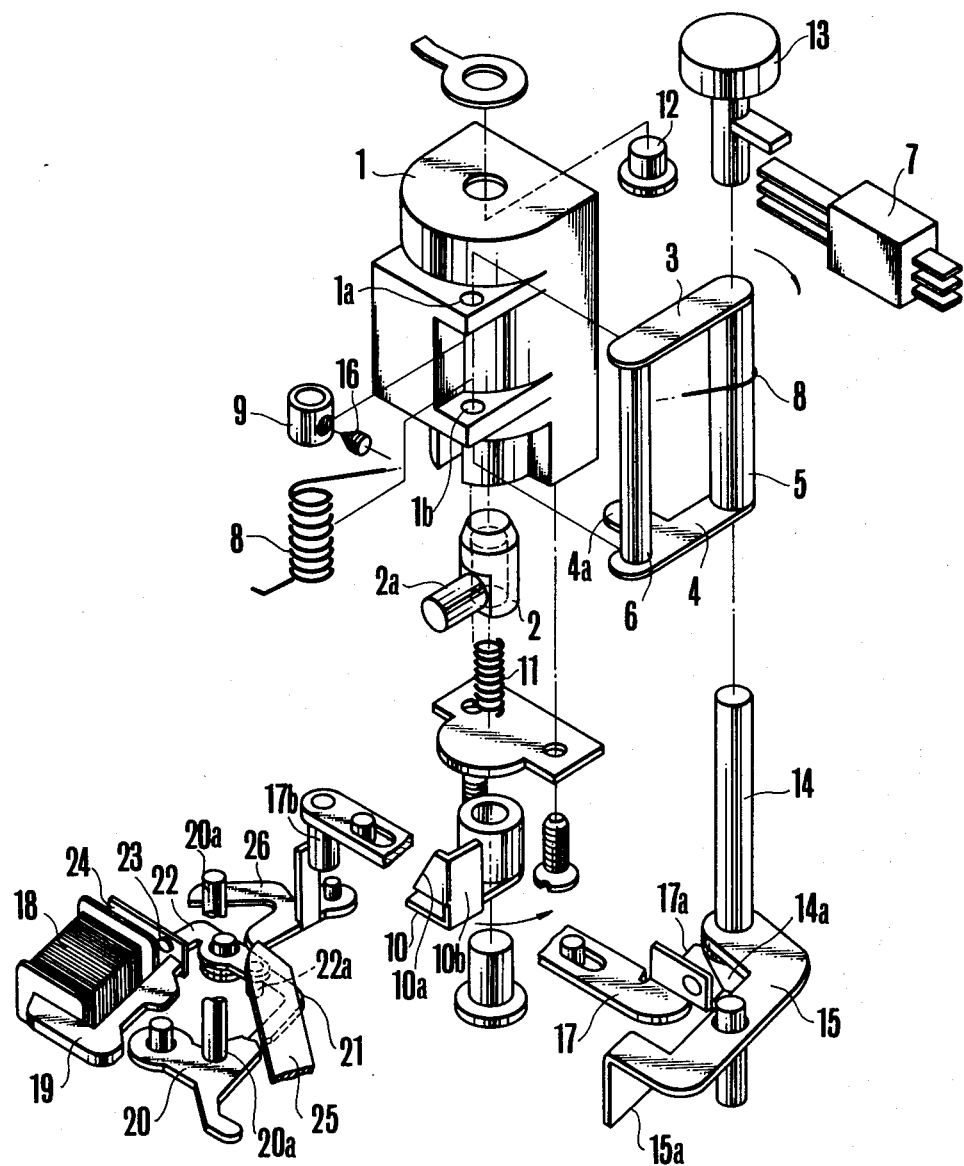
FIG. 1 is an exploded perspective view of a release mechanism of a camera employing one form of the present invention.

The present invention as described in connection with an embodiment thereof by reference to the drawings is shown in FIG. 1 which illustrates a release actuation mode changeover mechanism. In FIG. 1, a battery casing 1 which accommodates a battery (not shown) has a movable contact point 2 urged by a bias spring 11. This movable contact point 2 functions such that when the battery is loaded, it is forcibly pushed down to turn a changeover cam 10. A release lever 3 is fixed at its ends to a slide shaft 6 and a release shaft 5 at the ends thereof, the opposite ends of which are fixed to the ends of a changeover lever 4. This changeover lever 4 responsive to action of the changeover cam 10 sets the camera in the mechanical release actuation mode. The release shaft 5 fixedly carried between the release lever 3 and changeover lever 4 is arranged upon selection of the mechanical release actuation mode to constitute a drive connection between a release button 13 and a release shaft 14. The slide shaft 6 is arranged to be rotated by the changeover cam 10 and upon unloading of the battery to be slidingly movable in cooperation with the release button 13. A release spring 8 urges the slide shaft 6 is counterclockwise direction and in an upward direction. A spring fastener 9 is fixed to the slide shaft 6 by a set screw 16 and functions to adjust the force of the release spring 8. The changeover cam 10 responsive to loading of the battery is turned by the movable contact member 2 so that the release shaft 5 is taken out of the drive connection. The spring 11 urges the movable contact member 2 is an upward direction. 12 is a fixed contact member for the battery. The release button 13 controls the ON and OFF operation of an electromagnetic release switch 7 and is arranged upon selection of the mechanical release actuation mode to cooperate with the release shaft 14. The mechanical release shaft 14 constitutes part of a mechanical release arrangement and is given an upwardly moving tendency. A winding stop holding plate 15 is fixed to the mechanical release shaft 14 and has an inclined portion 15a. The mechanism also includes: a mechanical release slide plate 17 for releasing the engagement of an automatic diaphragm latch lever 26 and an automatic diaphragm level 25; an electromagnetic release control attraction type magnet 18; an electromagnetic release control attraction type magnet yoke 19; and a latch lever 21 for releasing a knock lever 20 from latching connection. The lever 20 in turn releases the automatic diaphragm latch lever 26 from latching connection. This latch release by the latch lever 21 is carried out by the action of the magnet 18 through an armature 24 fixed to an armature lever 22 and the armature lever 22 and through a pin 22a fixed to said armature lever 22. The armature lever 22 has the armature 24 fixed thereto by a rivet 23 and also has the pin 22a fixed thereto so that the pin 22a turns the latch lever 21. The automatic diaphragm lever 25 actuates an automatic diaphragm and shutter mechanisms and a mirror drive mechanism. The automatic diaphragm latch lever 26 latches automatic diaphragm lever 25.

Figure 2:
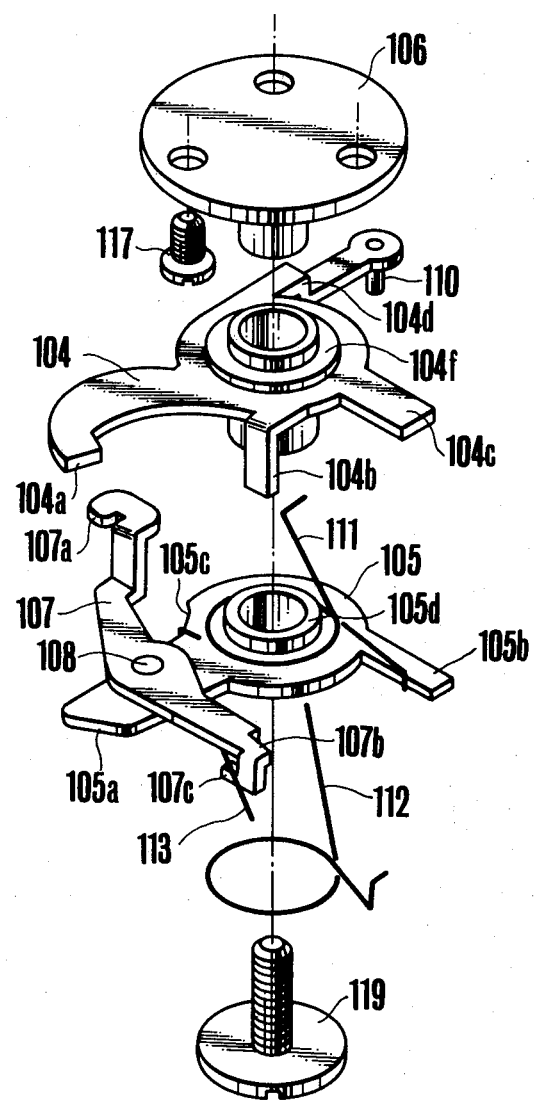
FIG. 2 is an exploded perspective view of a winding stop mechanism of the camera of FIG. 1.
Figure 3:
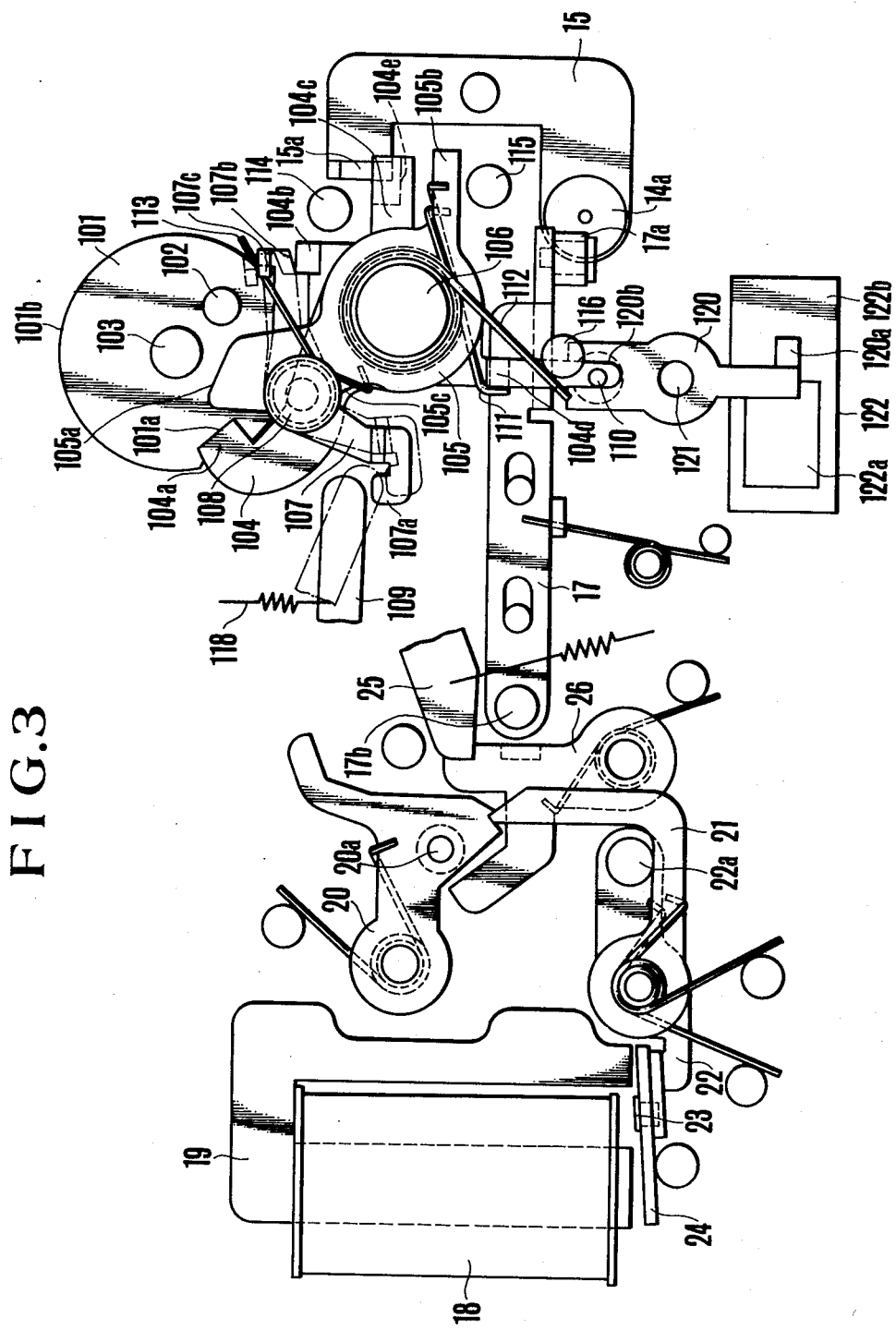
FIG. 3 is an elevational view illustrating relationship between the release mechanism and the winding stop mechanism of FIGS. 1 and 2 in a wound position.
Figure 4:
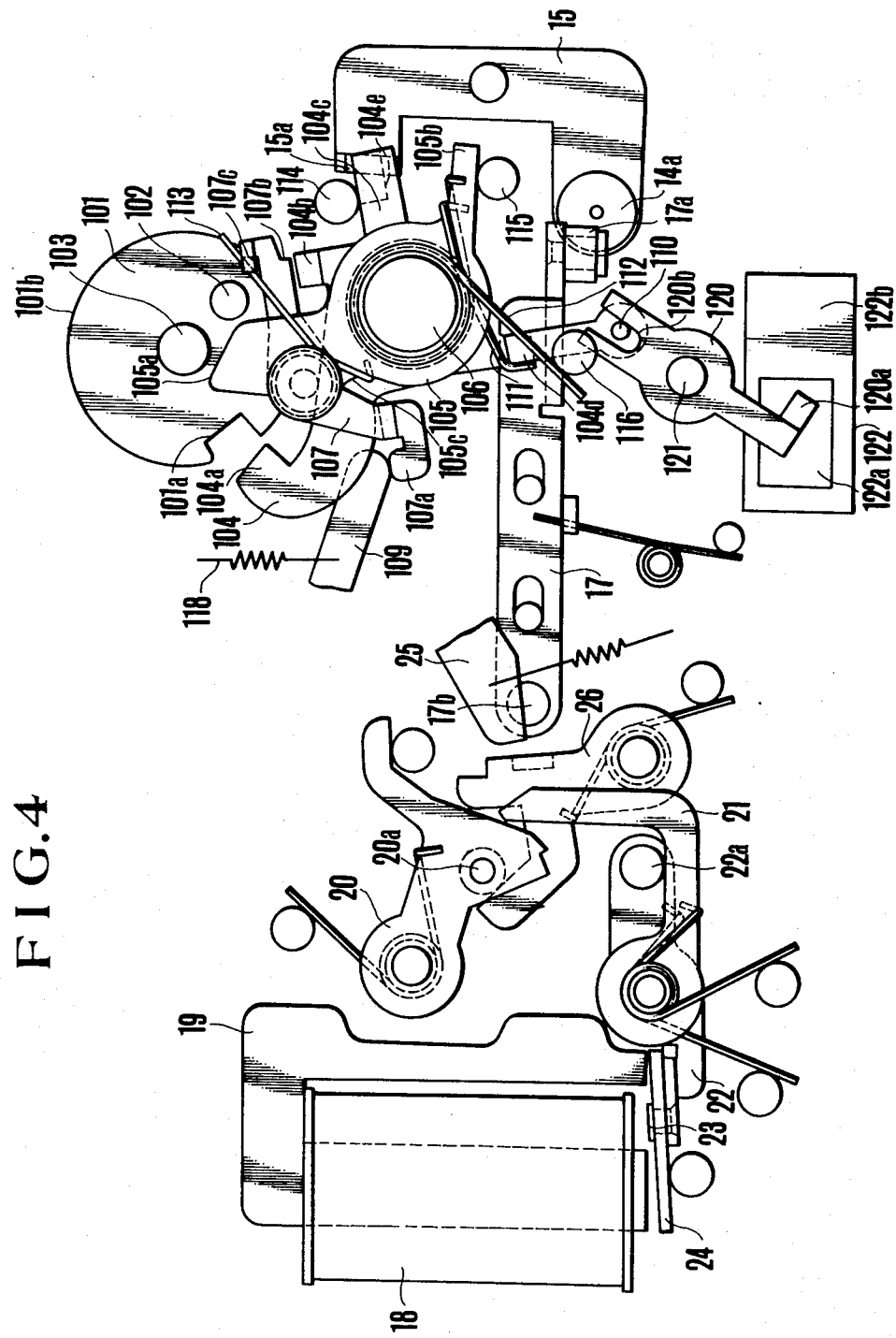
FIG. 4 is a view similar to FIG. 3 except an electromagnetically released position is illustrated.
Figure 5:
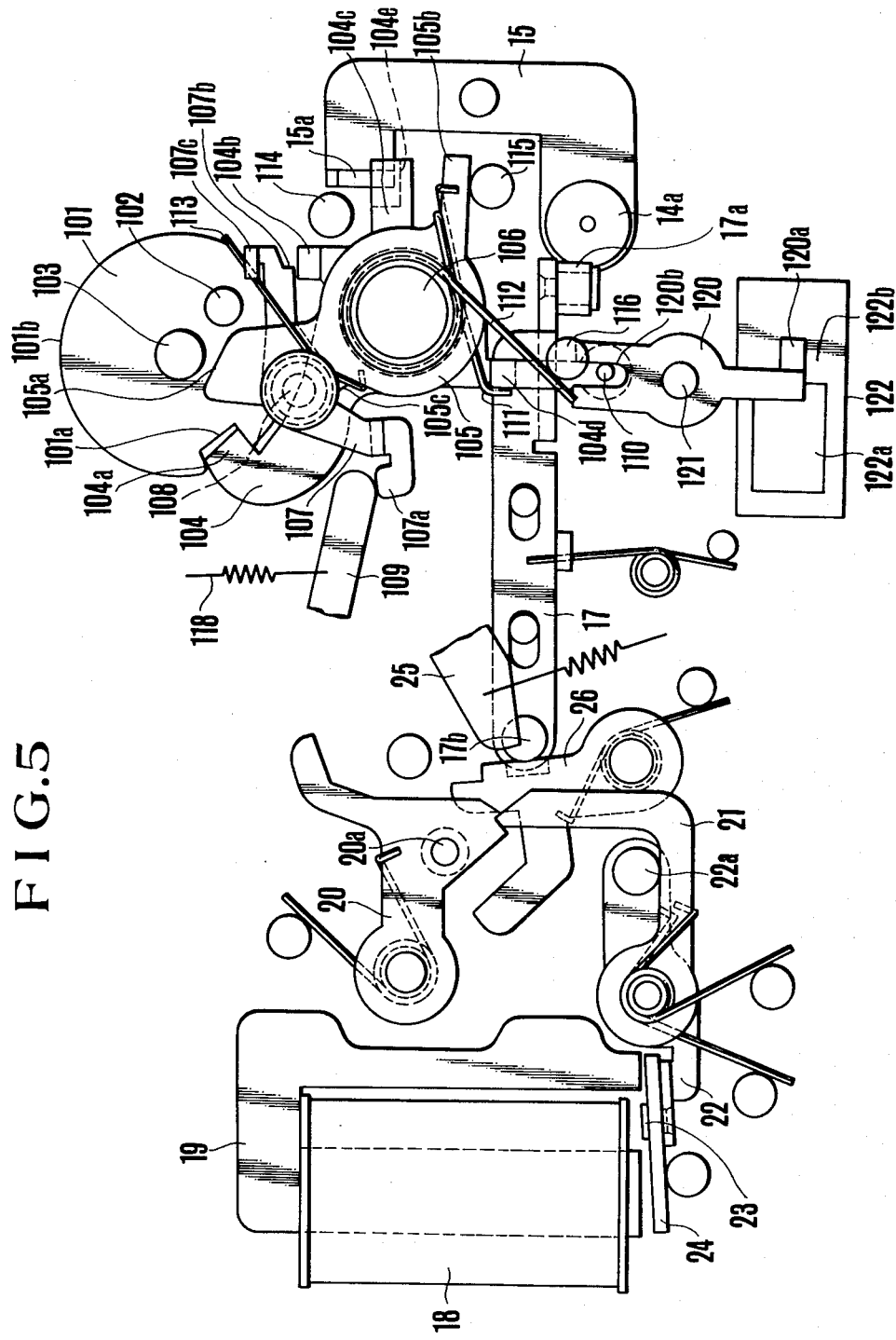
FIG. 5 is a view similar to FIG. 3, except a mechanically released position is illustrated.

FIG. 2 illustrates a winding stop mechanism, and FIGS. 3 to 5 illustrate the relationship between the release mechanism and the winding stop mechanism. In these figures, 101 is a winding stop cam rotating about a shaft 103 in a clockwise direction one revolution for each cycle of winding operation, this winding stop cam 101 having a cutout portion 101a for engagement with a pawl 104a of a winding stop lever 104 and a circular portion 101b for abutment with the pawl 104a. The cam 101 also has a pin 102 abuttingly engageable with one end 105a of a winding stop charge lever 105. The winding stop lever 104 and winding stop charge lever 105 are fitted through respective fixed bushings 104f and 105d on a common shaft 106 fixed to a camera housing (not shown) by screw fasteners 117. The winding stop lever 104 has, in addition to the pawl 104a, a bent portion 104b for engagement with a cutout portion 107b of a winding stop latch lever, an extention 104c for abutment on a stopper 114, a spring bearing portion 104d and an inclined portion 104e for abutment on an inclined portion 15a of the aforesaid winding stop holding plate 15. Also, the winding stop lever 104 has a pin 110 fixed to one end thereof, and is urged by a spring 111 one end of which bears on an armed portion 105b of the winding stop charge lever 105 with the opposite end bearing on the spring bearing portion 104d in a counterclockwise direction relative to the winding stop charge lever 105. The winding stop charge lever 105 is urged in a clockwise direction by a spring 112 one end of which bears on the armed portion 105b with the opposite end of which being beared on a spring abutment or pin 116, and its range of rotation is limited by a stopper 115. The winding stop latch lever 107 is rotatably mounted on a shaft 108 fixed to the winding stop charge lever 105 and has an abutment portion 107a for abutment on an end of a trailing curtain signal lever 109 with the cutout portion 107b being engageable with the bent portion 104b of the winding stop lever 104. Also, the winding stop latch lever 107 is urged in a clockwise direction relative to the charge lever 105 by a spring 113, one end of which bears on a spring abutment portion 107c and the opposite end of which bears on a curved portion 105c of the charge lever 105. The trailing curtain signal lever 109 is caused by a mechanism (not shown) to move in a limited range when the trailing curtain runs down against the force of a spring 118 and then quickly return. The winding stop lever 104 and winding stop charge lever 105 are pivotally mounted about the shaft 106 by a screw fastener 119. A switch actuator lever 120 is pivotally mounted about a shaft 121 fixed to the camera housing (not shown) and is electrically conductive with the camera housing. Also that switch actuator lever 120 has a brush 120a fixed at one end thereof and electrically conductive therewith, and a forked portion 120b at the opposite end thereof. Between the arms of the forked portion 120b there lies the pin 110 of a dimension to provide a gap between the pin 110 and either one of the arms of the forked portion 120b, while still permitting motion of the pin 110 to turn the lever 120. The brush 120a, which is fixedly carried on the switch lever 120, slides on a substrate 122 which has a conductive patch 122a and an electrically insulated patch 122b. And, when the brush 120a moves to the conductive patch 122a or the insulated patch 122b, a control circuit of known construction is supplied with a signal representing the termination of a winding operation or an exposure operation.

Figure 6:
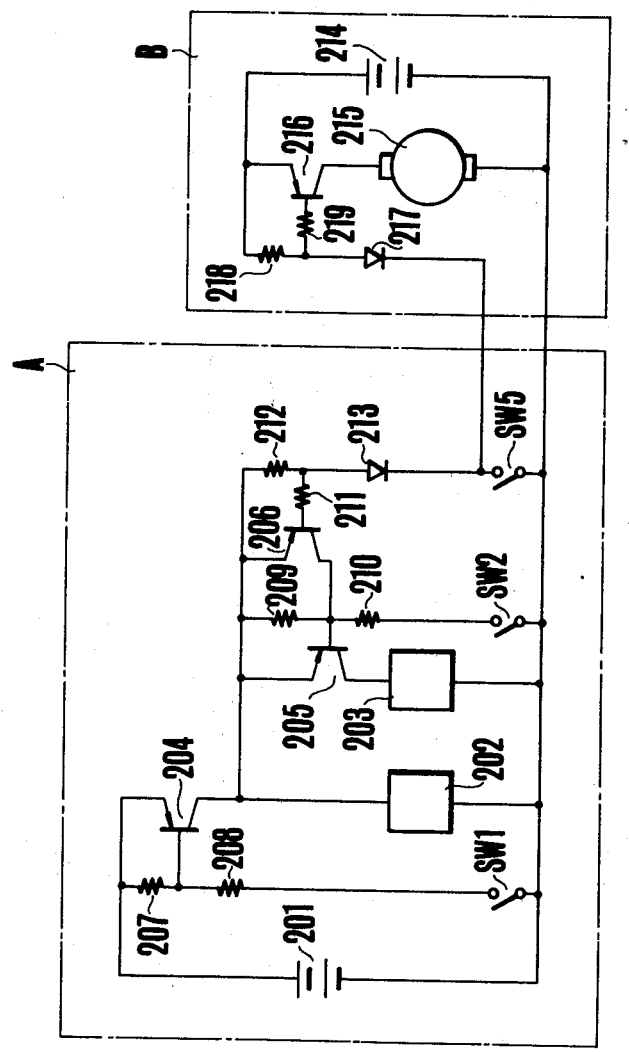
FIG. 6 is an electrical circuit diagram of the camera of FIG. 1 associated with a motor drive unit.

FIG. 6 illustrates the circuitry of the camera A and the motor drive unit B which includes:

a battery 201; a light metering circuit 202; a shutter control circuit 203; and PNP transistors 204, 205, 206. A light metering switch SW1 corresponds to the electromagnetic release switch 7 of FIG. 1; as shutter switch SW2 also corresponds to the electromagnetic release switch 7 of FIG. 1; a winding switch SW5 corresponds the switch actuator lever 120 and substrate 122 of FIGS. 3 to 5. 207, 208, 209, 210, 211, 212 are resistors. 213 is a diode. 214 is a battery; 215 is a winding motor; 216 is a PNP transistor; 217 is a diode; 218, 219 are resistors.

In the operation of the aforesaid mechanisms and with reference to FIG. 1, when the battery 201 is inserted into the chamber 1, the pole of the battery pushes down the movable contact 2. As the projection 2a pushes the changeover cam 10 at the slope 10a, the changeover cam 10 is turned in the counterclockwise direction (indicated by arrow). Therefore, the side wall 10b of the changeover cam 10 pushes the arm 4a of the changeover lever 4, whereby the changeover lever 4 is turned in the clockwise direction (indicated by arrow). Thus, the release lever 3 and changeover lever 4 are retracted from an operatively connecting position for the release button 13 and the mechanical release shaft 14. In other words, it is in this position that actuation of the release button 13 results only in turning on of the electromagnetic release switch 7, while the mechanical release shaft 14 is left inaccessible, and, therefore, the electromagnetic release actuation mode is automatically selected. Next, when the battery is removed, the movable contact 2, changeover cam 10, release lever 3 and changeover lever 4 are moved under the action of the release spring 8 so that the release button 13 is operatively connected to the mechanical release shaft 14. Thus, the camera is switched to the mechanical release actuation mode. At this time, the electromagnetic release switch 7 too is operative, but the lack of the battery renders the electromagnetic release inoperative.

With the release mode changeover device, at first when the camera is loaded with the battery, electromagnetic actuation of the camera release operates in the manner described hereinafter.

In the wound position of FIG. 3, upon engagement of the parts 101a and 104a with each other, the film is hindered from being advanced in excess of the length of one frame. Also, the pin 110 lies in abutment on the left arm of the forked portion 120b of the actuator lever 120 for the switch 122 and separated from the right arm so that the brush 120a is allowed to contact with the insulated patch 122b on the substrate 122. Therefore, as will be described hereinafter with reference to FIG. 6, the shutter control circuit in the camera is operable, but the control circuit in the motor drive unit is cut off. Then, when the release button 13 (FIG. 1) is pushed down, the electromagnetic release switch 7 (see FIG. 1) is turned on to energize the magnet 18, whereby the armature lever 22 is turned in the clockwise direction as viewed in FIG. 3, and the latch lever 21 is turned in the clockwise direction in engagement with the pin 22a until it disengages from the knock lever 20. Then, the knock lever 20 is turned in the counterclockwise direction by its bias spring. Then, the pin 20a on the knock lever 20 turns the latch lever 26 to release the automatic diaphragm lever 25 from the latching connection, thus initiating an operation of the automatic diaphragm, shutter mechanism and mirror drive mechanism. After the termination of the exposure, at a time during which the trailing curtain of the shutter runs down, the lever 109 which is fragmentally shown in FIG. 3 is moved to a certain limited distance against the force of the spring 118, whereby, as its end strikes the tail 107a the latch lever 107 is turned in the counterclockwise direction against the spring 113. When it reaches the position illustrated by the double dot and single dash lines in FIG. 3, the cutout portion 107b moves away from the bent portion 104b, permitting the winding stop charge lever 105 to turn under the action of the spring 112 until its arm 105 abuts on the stopper 115 and also the winding stop lever 104 to turn under the action of spring 111 until the part 104c abuts on the stopper 114. Thus, the parts 101a and 104a are disengaged from each other. Such movement of the winding stop lever 104 causes the pin 110 to turn the actuator lever 120 in the clockwise direction which in turn causes the brush 120b to move to the electrically conductive patch 122b on the substrate 122. As will be described more fully hereinafter in connection with FIG. 6, the shutter control circuit in the camera is rendered inoperative, while the control circuit in the motor drive unit is turned on to initiate the next cycle of film winding operation. Therefore, with the use of the motor drive unit, the photographer can take a continuous succession of photographs so long as the shutter button is depressed.

Next when the camera is without the battery, that is, switched to the mechanical release actuation mode, the shutter control circuit in the camera is rendered always inoperative and the camera cannot be electromagnetically released.

As has been mentioned before, in the cocked position of the camera illustrated in FIG. 3, the parts 101a and 104a, and the parts 107b and 104b are engaged with each other, the engagement of the parts 101a and 104a locking the film transportation mechanism, and positioning of the pin 110 is at such a location that there is a gap between the pin 110 and the right arm of the forked portion 120b of the switch actuator lever 120 resulting in the contact of the brush 120a with the insulated patch 122b of the substrate 122. Therefore, as will be more fully described hereinafter in connection with FIG. 6, the control circuit of the motor drive unit is cut off from the power supply. Then, when the release button 13 (see FIG. 1) is pushed down, the mechanical release shaft 14 is moved upwards (downwards as viewed in FIG. 1), and the winding stop holding plate 15 too is simultaneously moved upwards (downwards as viewed in FIG. 1). Such movement of the shaft 14 is transmitted by the tapered portion 14a to leftward sliding movement of the mechanical release slider 17, whereby, as illustrated in FIG. 4, the automatic diaphragm latch lever 26 is turned in the clockwise direction in engagement with the pin 17b to release the automatic diaphragm lever 25 from the latching connection, thus initiating operation of the automatic diaphragm, shutter mechanism and mirror drive mechanism. This operation is followed after the shutter time by motion of the trailing curtain signal lever 109 of FIG. 3 to a certain distance against the force of the spring 118. When its top end strikes the winding stop latch lever 107 at 107a, it is turned in the counterclockwise direction against the spring 113. When the position shown by the double dot and single dash line in FIG. 3 is reached, the parts 107b and 104b are disengaged from each other, and the winding stop charge lever 105 is turned by the spring 112 until the arm 105b abuts on the stopper 115. Then, the winding stop lever 104 is turned in the counterclockwise direction by the spring 111. But its rotation is hindered from further advance before abutment on the stopper 114 as the inclined portion 104e abuts on the inclined portion 15a of the winding stop holding plate 15 which is in the lifted position. Therefore, the winding stop lever is allowed to turn only a little, leaving the engagement of the parts 101a and 104a unreleased. Thus the next cycle of winding operation never proceeds. This position is illustrated in FIG. 5. Also, from the position of FIG. 3 to the position of FIG. 5 the pin 110 on the winding stop lever 104 is moved through the aforesaid short angular distance in the counterclockwise direction. But, because of the presence of the gap, the pin 110 does not act on the switch actuator lever 120, thus leaving the control circuit of the motor drive unit cut off from the current supply, and the camera is not driven to wind up the film. This state is illustrated in FIG. 5. Then, when the photographer removes his finger from the release button 13 (see FIG. 1), the downwardly urged mechanical release shaft 14 (upwardly urged as viewed in FIG. 1) moves downwards (upwards in FIG. 1), and at the same time the winding stop holding plate 15 moves downwards (upwards in FIG. 1). This results in that the inclined portion 15a of the winding stop holding plate 15 is disengaged from the inclined portion 104e of the winding stop lever 104 to permit the winding stop lever 104 to turn under the action of the spring 111 until it abuts on the stopper 114, and the pawl 104a is moved away from the recess 101a. And, as the winding stop lever 104 turns, the pin 110 turns the actuator lever 120 in the clockwise direction so that the brush 120b is displaced to the conductive patch 122b. Then, the motor drive unit is rendered operative. In short, therefore, with the use of the motor drive unit, when in the mechanical release actuation mode, the completion of the exposure followed by removal of the finger from the release button effects energization of the control circuit (not shown) in the motor drive unit and initiation of the next cycle of film winding operation. Thus, a single frame exposure operation is carried out.

Now referring to FIG. 6, in the control circuit, SW1 and SW2 are cooperative with the release button. By a first stroke of the release button, SW1 is closed, and by a second stroke thereof, SW2 is closed. When SW1 is closed, base current flows through the resistor 208 to the transistor 204, whereby the transistor 204 is rendered conducting and the light metering circuit is rendered operative. The transistors 205 and 206 remain non-conducting. Then, when SW2 is closed, base current flows through the resistor 210 to the transistor 205, whereby the transistor 205 is rendered conducting, and the shutter control circuit 203 is rendered operative. Therefore, the leading curtain of the shutter runs down. After that, when the trailing curtain runs down, the winding switch SW5 is closed, allowing base current to flow through the resistor 211 and diode 213 to the transistor 206. Since that current which flows through the resistor 210 comes from the transistor 206, the transistor 205 is rendered non-conducting. Therefore, when the winding switch SW5 is closed, the shutter control circuit no longer operates.

Such closure of the winding switch SW5 also causes base current to flow through the resistor 219 and diode 217 to the transistor 216, whereby the transistor 216 is rendered conducting to energize the motor 215. As the motor 215 rotates, the shutter is charged, and the film is advanced. When one-frame advancement of the film is reached, the winding switch SW5 is turned off again.

As the release button remains pushed down, and the SW1 and SW2 remain closed, the termination of the film winding operation is automatically followed by initiation of another shutter operation. Thus, the exposure followed by the winding operation repeats itself until the release button is returned to open the switch SW5.

The diodes 213 and 217 prevent current flow from the batteries in the camera and motor drive unit into other devices.

It is to be noted that when the battery 201 is taken out of the camera, from the electrical standpoint the shutter control circuit no longer works. But, the winding switch SW5 only is mechanically actuable so that when in the mechanical release actuation mode, release of the shutter button results in turning on the winding switch SW5. Therefore, the motor drive unit B with the supply of current from the battery 214 drives the camera to wind up the film. At the termination of the film winding operation, the winding switch SW5 is turned off, and the motor 15 is no longer energized. In short, even when the camera is mechanically released, the film is automatically wound up, although through the length of only one frame.

After completion of an exposure, when a winding operation starts from the position of FIG. 4, the winding stop cam 101 rotates in the clockwise direction, while the pin 102 turns the winding stop charge lever 105 in the counterclockwise direction in sliding engagement on the side edge 105a against the springs 111 and 112. Since, at this time, the winding stop latch lever 107 also is moved in the same direction, as rotative movement of the pin 102 continues, cutout portion 107b is brought into abutting engagement with bent portion 104b. It is noted that so long as the pin 102 rides on 105a, the engagement of 107b and 104b is not a perfect one, but slightly over-charged.

As rotation of the winding stop cam 101 further advances, the pin 102 moves away from 105a, causing the winding stop charge lever 105 to turn in the clockwise direction under the action of spring 112, and therefore the portions 104b and 107b completely engage with each other. In this position, the winding stop charge lever 105 is urged in the clockwise direction by the spring 112. Therefore, the winding stop lever 104 is urged similarly in the clockwise direction through the engagement of portions 104b and 107b. Therefore, after the point in time at which portions 104b and 107b completely engage with each other, the pawl 104a contacts with the circular portion 101b of the winding stop cam 101.

After that, the winding stop cam 101 rotates while contacting with the pawl 104a. When it moves to the position where the pawl 104a is aligned with the cutout portion 101a, as it is biased in the clockwise direction, the pawl 104a drops into the cutout 101a, and the film is thus stopped from further advancement.

Also the switch actuator lever 120 is turned in the counterclockwise direction by the pin 110 as the pawl 104a of the winding stop lever 104 drops into the cutout portion 101a of the winding stop cam 101, the brush 120a is thereby moved from the electrically conductive patch 122a to the non-conductive patch 122b, and the shutter control circuit in the camera is therefore rendered inoperative.

Also, the knock lever 20 and automatic diaphragm lever 25 are returned to the engaging position by an operating member (not shown).

As has been described in greater detail above, the present invention provides an electromagnetically releasable camera with means making it possible to mechanically actuate a camera release when the battery is discharged, said means being in the form of a switch arranged to alternately change its position in response to operation of the release button when in the mechanical actuation-of-release mode, depending upon the terminations of a film winding operation and an exposure operation. Even when the battery in the camera is discharged and a new battery is not available, the photographer can operate the camera in the mechanical actuation-of-release mode and can employ automatic driving provided with the use of the motor drive unit, as the finger is removed from the release button after the termination of an exposure. After the termination of the winding operation, upon depression of the release button, the camera is mechanically actuated to make an exposure. Thus, the photographer is not prevented from taking additional photographs due to the power loss, and the camera operates in a motor driven single frame exposure mode even when the battery in the camera is discharged.

Another advantage arising from the use of so weak a spring in urging the winding stop latch lever in the clockwise directions to sustain its latching connection is that the magnitude of force for releasing the film transportation mechanism from the latching connection can be minimized, and the accuracy and reliability of the winding stop release control is not susceptible to the lowering of the speed of the shutter curtain at low temperatures, as the trailing curtain carrier strikes the latch lever at its tail.

Further, the smaller the magnitude of force necessary to release, the smaller the load given to the trailing curtain carrier becomes. Therefore, the running speed characteristics of the shutter are stabilized and the usable life is increased. Further, as the springing force is reduced, the property of the spring itself is stabilized. Therefore, the structure of the camera is made more stable.

While specific embodiments of the invention have been shown and described in detail to illustrate the application of the inventive principles, it will be understood that the invention may be embodied otherwise without departing from such principles.

What is claimed is:

1. A camera capable to changing over between electrical release and mechanical release operation, comprising:
   (a) a release member for actuation of a camera release operation;
   (b) an electromagnetic release mechanism for electromagnetically controlling the operation of said release member;
   (c) a mechanical release mechanism for mechanically controlling the operation of said release member;
   (d) changeover means for changing over the functional connection of said release member from with one of said electromagnetic release mechanism and said mechanical release mechanism to the other;
   (e) control means alternately switched between a first position where said electromagnetic release mechanism is rendered operative and a second position where the winding operation is rendered possible, said control means assuming said first position when the winding operation is terminated, and said second position when the exposure operation is terminated;
   (f) operating means for actuating said electromagnetic release mechanism or said mechanical release mechanism depending upon the switched position of said changeover means, said operating means being movable between a first position where a releasing operation is carried out and a second position where the releasing operation is not carried out; and (g) means responsive to establishment of a functional connection between said release member and said mechanical release mechanism by said changeover means for hindering said control means from being switched to said second position when said operating means is in said first position, and for permitting said control means to be switched to said second position when the operating means is in said second position.

2. A camera according to claim 1, wherein said operating means is a release button.

3. A camera according to claim 1 wherein said changeover means is changed over in response to loading of a battery in said camera, whereby when said battery is loaded, the release member and the electromagnetic release mechanism are functionally connected to each other, and when said battery is unloaded, the release member and the mechanical release mechanism are functionally connected to each other.

4. A camera capable of changing over between electromagnetic release and mechanical release operation, comprising:

(a) changeover means for changing over between electromagnetic release and mechanical release operation;

(b) control means alternately switched between a first position where the electromagnetic release operation is rendered operative and a second position where a winding operation is rendered possible, said control means assuming said first position when the winding operation is terminated, and said second position when the exposure operation is terminated;

(c) operating means for carrying out the electromagnetic release or the mechanical release operation depending upon the position of the changeover means, said operating means being movable between a first position where a releasing operation is performed and a second position where the releasing operation is not performed; and (d) means responsive to changing over to the mechanical release by said changeover means for hindering said control means from being changed over to said second position when said operating means is in said first position and for permitting said control means to be changed over to said second position when said operating means is in said second position.

5. A camera capable of changing over between electromagnetic release and mechanical release operation, comprising:

(A) changeover means for changing over between electrical release and mechanical release operation;

(B) control means alternately switched between a first position where electromagnetic release operation is rendered possible, and a second position where a winding operation is rendered possible, said control means assuming said first position when the winding operation is terminated, and said second position when the exposure operation is terminated, said control means having:

(a) a rotary member rotating as the winding operation occurs, said rotary member having an engagement portion;

(b) a winding stop member arranged upon engagement with the engagement portion of said rotary member to stop the winding operation; and (c) a holding member for holding said winding stop member in the engaged position, said holding member being brought into the holding state in association with the winding operation, and being released from the holding state upon completion of the exposure operation;

(C) operating means for performing electromagnetic release or mechanical release operation depending upon the position of said changeover means, said operating means being movable between a first position where a releasing operation is performed, and a second position where the releasing operation is not performed; and (D) prevention means for preventing said winding stop member from changing over to said second position when said operating means is in said first position, and for permitting said winding stop member to change over to said second position when said operating means is in said second position.

6. A camera according to claim 5 wherein said prevention means is an association member which operates in association with a mechanical release operation when the camera is changed over to mechanical release operation.

7. A camera to which a motor drive unit is attachable, comprising:

(A) a camera body, said body having:

(a) a release member for actuation of a camera release operation;

(b) an electromagnetic release mechanism for electromagnetically controlling the operation of said release member;

(c) a mechanical release mechanism for mechanically controlling the operation of said release member;

(d) changeover means for changing over the functional connection of said release member from with one of said electromagnetic release mechanism and said mechanical release mechanism to the other;

(e) control means alternately switched between a first position where said electromagnetic release mechanism is rendered operative and a second position where a winding operation is rendered possible, said control means having a switch arranged to take said first position when the winding operation is terminated, and said second position when the exposure operation is terminated;

(f) operating means for actuating the electromagnetic release mechanism or the mechanical release mechanism depending upon the switched position of said changeover means, said operating means being movable between a first position where a releasing operation is performed and a second position where the releasing operation is not performed; and (g) means responsive to establishment of a functional connection between the release member and the mechanical release mechanism by said changeover means for hindering said switch from being changed over to said second position when said operating means is in said first position and for permitting said switch to be changed over to said second position when the operating means is in said second position; and (B) a motor drive unit, said unit having:

(h) winding drive means which are driven when said switch is in said second position.

* * * * *

UNITED STATES PATENT AND TRADEMARK OFFICE
CERTIFICATE OF CORRECTION

PATENT NO. : 4,448,507
DATED : May 15, 1984
INVENTOR(S) : Akio Sunouchi, et al

It is certified that error appears in the above-identified patent and that said Letters Patent is hereby corrected as shown below:

IN THE HEADING OF THE PATENT [73] SHOULD READ AS FOLLOWS:

-- [73] Canon Kabushiki Kaisha, Tokyo, JAPAN --.

Attorney, Agent, or Firm- TOREN, McGEADY and STANGER

Signed and Sealed this

Eighteenth Day of December 1984

[SEAL]

*Attest:*

GERALD J. MOSSINGHOFF

*Attesting Officer* *Commissioner of Patents and Trademarks*